United States Patent Office

2,978,347
ORGANO-ZIRCONIUM DERIVATIVES

James O. Koehler, Parma, and Headlee Lamprey, Lakewood, Ohio, assignors to Union Carbide Corporation, a corporation of New York No Drawing. Filed Dec. 21, 1956, Ser. No. 629,797

10 Claims. (Cl. 106—308)

This invention relates to organic derivatives of zirconium, and to their use as pigment dispersants.

Synthetic organic pigments are in widespread use in the making of paints, varnish and organic-base inks. In many respects, these synthetic materials possess properties superior to those of traditional ingredients used in this art. They unfortunately possess certain surface characteristics which render difficult their dispersion in many vehicles. Such is especially the case where the vehicle is one of the more desirable synthetic resins. The unsolved dispersion problem limits the use of many synthetic organic pigments.

Many aqueous surface active agents have been suggested, and tried as pigment dispersants. In general, these perform commendably in reducing the time required to disperse inorganic pigments such as titanium dioxide in certain vehicles to furnish good quality products. When used with synthetic organic pigments, these agents have considerably less effect. In addition, the selection of prior art dispersants heretofore has been principally empirical. It has been noted that some dispersants give adequate dispersion stability, but do not supply needed fluidity characteristics. Similarly, a given dispersant may give excellent results with one type of mixing equipment but only inadequate results with another. All in all, presently available commercial dispersants are useful only in certain systems and with particular mixing equipment.

With a view to overcoming the above-indicated limitations of prior art, the present invention has for its main object the provision of new dispersants and grinding aids capable of effecting more rapid and finer dispersions of pigments than heretofore possible.

Another object is to provide pigment dispersants capable of equally excellent performance in all types of mechanical mixing equipment.

The dispersants subject of the invention may be characterized as organo metallic derivatives of zirconium, which fall into two general classes.

(1) Metal aminoalcohol derivatives having the formulae $$(RO)_xZr[OC_2H_4N(R')_2]_{4-x}$$

and $$(RO)_xZr[OC_2H_4N(R')_2]_{4-x}\cdot(HO_2C-R'')_y$$

wherein R is an aryl, alkaryl, aralkyl, alkyl or substituted alkyl group having from 1 to 18 carbon atoms, R' is H or aryl, alkaryl, aralkyl, alkyl or substituted alkyl group having from 1 to 4 carbon atoms, R" is an alkyl or a substituted alkyl group having from 10 to 18 carbon atoms, x may be from 0 to 3, and y equal to or less than (4—x).

(2) Metal polyhydric alcohol derivatives having the formula

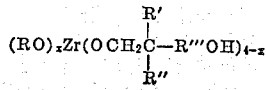

wherein R is an aryl, aralkyl or alkaryl group having from 1 to 18 carbon atoms, R' is OH, or an alkyl or substituted alkyl radical, R" is a hydrogen, H or alkyl or substituted alkyl radical, R''' is an alkylene or substituted alkylene group, and x is a number from 1 to 3.

The dispersants of the present invention have a marked effect on the properties of pigment-containing systems when present in such systems in an amount ranging from as little as 0.1 percent to about 5 percent of the total system weight. A suitable range found operative for various pigment types is from 0.5 percent to about 2.0 percent.

The compounds of the invention are operative in conventional paint, varnish and organic based ink media, which may contain kerosene, terpenes, xylenes, natural and synthetic resins, such as alkyd, phenolic resins and oleo-resins. Various "thinner" mixtures may be used in conjunction with these media for conventional purposes. Typically, one such thinner may comprise a ketone solvent such as methyl ethyl ketone and an aromatic diluent such as toluene. The media to which the compounds of the invention may be added may include also any of the conventional plasticizer compounds such as the monomeric phthalates or phosphates.

The preparative methods of the invention are further illustrated by the following examples, in which the amounts of reactants are expressed in parts by weight unless otherwise indicated.

EXAMPLE I

*Preparation of diisopropyl-di-(triethanolamine)-zirconate-N-oleate*

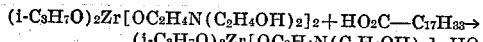
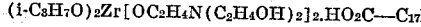

In a 1-liter beaker were placed 252.5 g. (0.5 mol) of diisopropyl-di-(triethanolamine)-zirconate and 141 g. (0.5 mol) of oleic acid. The mixture was stirred with a mechanical stirrer until the heat of reaction subsided and the temperature of the solution reached room temperature. The yield was quantitative.

| | Analysis | |
| --- | --- | --- |
| | Found, Percent | Calc'd., Percent |
| Zr | 10.8, 10.9 | 11.55 |
| N | 3.16, 3.22 | 3.56 |

EXAMPLE II

*Preparation of diethyl-di-(triethanolamine)-zirconate*

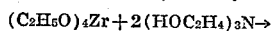

In a 1 liter round-bottomed flask fitted with a Stark and Dean trap equipped with a reflux condenser were placed 135.7 g. (0.5 mol) of tetraethyl zirconate and 149.2 g. (1 mol) of triethanolamine. The flask was heated until 58 mls. (1 mol) of ethanol were collected in the trap. The solution was cooled and vacuum stripped at room temperature to remove residual alcohol. An amber colored liquid weighing 230 g. (97 percent of the theoretical amount) was obtained.

| | Analysis | |
| --- | --- | --- |
| | Calc'd., Percent | Found, Percent |
| Zr | 38.2 | 36.1, 36.3 |
| N | 11.7 | 10.2, 10.3 |

EXAMPLE III

*Preparation of diethyl-di-(triethanolamine)-zirconate-N-oleate*

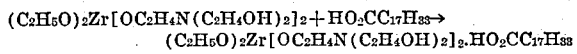

In a 600 ml. beaker were placed 119.5 g. (0.5 mol) of diethyl-di-(triethanolamine)-zirconate and 141 g. (0.5 mol of oleic acid. The mixture was stirred with a mechanical stirrer until the heat of reaction subsided and the temperature of the solution returned to room temperature. The yield of this compound was quantitative.

|    | Analysis ||
|----|-----------------|-----------------|
|    | Calc'd., Percent | Found, Percent |
| Zr | 17.47 | 17.3, 17.1 |
| N  | 5.38  | 5.12, 5.06 |

EXAMPLE IV

*Preparation of diethyl-di-(triethanolamine)-zirconate-N,N-distearate*

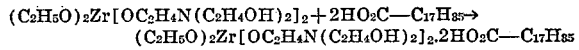

In a 1000 ml. beaker were placed 119.5 g. (0.5 mol) of diethyl-di-(triethanolamine)-zirconate and 284.5 g. (1 mol) of stearic acid. The mixture was heated on a hot plate until the stearic acid dissolved. The warm solution was stirred for ½ hour on the hot plate to complete the reaction. The yield was quantitative.

|    | Analysis ||
|----|-----------------|-----------------|
|    | Found, Percent | Calc'd., Percent |
| Zr | 10.6, 10.7 | 11.27 |
| N  | 3.26, 3.21 | 3.47 |

EXAMPLE V

*Preparation of diisopropyl-di-(2-ethylhexandiol-1,3)-zirconate*

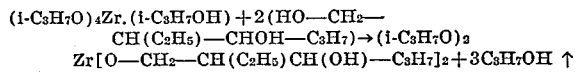

In a 1-liter round-bottomed flask fitted with a Stark and Dean trap and a reflux condenser were placed 143.5 g. (0.5 mol) of tetraisopropyl zirconate-isopropyl alcohol complex and 146.2 g. (1 mol) of 2-ethylhexandiol-1,3. The flask was heated until 114 ml. (1.5 mols) of isopropanol were obtained in the trap. The solution was cooled and vacuum stripped to remove the residual alcohol. We obtained 222 g. of a tan colored viscous liquid (85 percent of the theoretical amount).

|    | Analysis ||
|----|-----------------|-----------------|
|    | Calc'd., Percent | Found, Percent |
| Zr | 18.2 | 17.9, 17.8 |

EXAMPLE VI

*Preparation of diisopropyl-di-(triethanolamine)-zirconate*

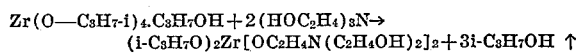

In a 1-liter round-bottomed flask were placed 143.5 g. (0.5 mol of tetraisopropyl zirconate-isopropanol complex and 149 g. (1 mol) of triethanolamine. The mixture was heated until 114 mls. (1.5 mols) of isopropanol were obtained in the trap. The solution was cooled and vacuum stripped to remove the residual alcohol. We obtained 227 g. (90 percent of the theoretical amount) of an amber colored liquid.

|    | Analysis ||
|----|-----------------|-----------------|
|    | Found, Percent | Calc'd., Percent |
| Zr | 18.0 | 17.2, 17.3 |
| N  | 5.55 | 5.62, 5.67 |

The compounds of the invention are soluble in $CCl_4$, $C_2H_5OH$ and water.

Characteristically, the compounds of the invention have a marked effect on the grinding and dispersing characteristics of pigments in conventional media used in pigment-containing paints, varnishes and organic-base inks. The dispersants of the invention result in a better quality end product, whether this product be a paint, lacquer, pigmented varnish or ink. This is due to the fact that their presence causes a retention of the uniform dispersion of the pigment in its media. In turn, such uniform dispersion results in excellent consistency of the finished product.

Such effects can be illustrated by a simple test featuring one of the compounds of the invention. In these test procedure two suspensions were prepared by adding 10 grams of cadmium sulfide pigment to 90 grams of kerosene. Four grams of diethyl-di-(triethanolamine)-zirconate-N,N-dioleate were added to one of the suspensions, and both suspensions were shaken separately for ten minutes. The suspension of cadmium sulfide in kerosene settled immediately, and was settled completely in one minute. By contrast, the suspension of cadmium sulfide in the kerosene solution containing the compound of the invention remained in suspension from five to eight hours before completely settling, and even then could be redispersed by slight agitation.

The dispersing ability of the compounds of the invention and their usefulness as grinding aids were evaluated using two types of pigment—titanium dioxide, and a synthetic pyrazolone red organic pigment. A modified alkyd resin was used as the vehicle in each case.

A mechanical mixer was employed in these dispersion tests, which mixer is essentially an accelerated ball mill employing ¼ inch steel ball bearings as the grinding elements. The test procedure consisted of charging this mixer with 200 to 300 ml. of pigment media mixture containing 1 percent by weight of the dispersant. Mixing was initiated, and at ten minute intervals small samples were taken from the dispersion. These small samples were placed on a Hegman gauge to determine the fineness of grind. This instrument is a steel plate containing an inclined impression, 0.005 inch deep at one end and 0 inch deep at the other end. The composition to be tested is placed in the deep end and a knife is drawn over the specimen to form a wedge of paint. By viewing the gauge under the proper light, coarse particles can be seen breaking through the paint film surface. The instrument is provided with a linear scale beginning with 0 at the point where the channel is 0.004 inch deep, and going to 8 where the channel is 0 inch deep. The point where particles break through the film is noted on the scale, and the reading on the scale at this point is a measure of the fineness of the grind.

Using the test procedure indicated above, the dispersing ability of the compounds of the invention was compared with that of conventional dispersants having a dioctyl sodium sulfosuccinate base (hereinafter referred to as dispersant "A").

The fineness values obtained on the Hegman gauge were plotted on graph paper against the time of grinding of the samples. The charges tested had the following composition.

150 grams titanium dioxide
147 grams alkyd resin
3 grams dispersant

Not only did the compounds of the invention give a better dispersion as indicated by the Hegman gauge, but they dispersed the titanium dioxide much more rapidly in the vehicle than did the prior art dispersants. Thus a blank test sample containing no dispersant required 30 minutes of grinding to reach a fineness of 6.5. Using one part of prior art dispersant "A" per 100 parts of pigment vehicle mixture, the grinding time required to reach a fineness of 6.5 was 25.6 minutes. However, using one part of the dispersants of the invention per 100 parts of mix reduced the grinding time to 23 minutes, representing a reduction of 7 minutes or of 23 percent in the overall grinding time. Even for such easily dispersible pigments as $TiO_2$, therefore, use of the dispersants of the invention can cut the time of dispersion by an additional 9 percent over the percent decrease observed through the use of prior art dispersants.

A further experiment showed the change of fineness with grinding time of paints containing 10 percent of a more difficultly dispersible synthetic organic red pigment. The composition contained the following ingredients:

108 grams titanium dioxide
12 grams synthetic organic red pigment
177 grams alkyd resin
13 grams dispersant (A or zirconate)

After 65 minutes both the blank sample containing no dispersant, and the sample containing dispersant "A" reached a fineness of 5.5, while the sample containing the zirconate dispersant of the invention gave a fineness of 6 at the end of the same grinding period. The same sample attained a fineness of 5.5 in 43 minutes, whereas the blank and sample "A" required 65 minutes to reach this fineness. This difference of 22 minutes represents a 34 percent decrease in the grinding time.

From the above examples it can be seen that the novel compositions of matter of the invention can provide a process for reducing the dispersion time of pigments in paint, varnish and ink media. Such a process comprises selecting at least one organo-metallic zirconium derivative disclosed above, adding the same to a mixture of pigment and pigment-suspending media, and thoroughly dispersing the dispersant in the mixture. By using from about 0.1 percent to 5 percent of this compound by weight of the total pigment and pigment media composition, it is possible to reduce the dispersion time of the pigments in their media by 9 percent to 34 percent.

It should be appreciated that the compositions above described are in no way intended to be limited as to their components, including their pigments and organic vehicles, since all of the constituents are well known in the prior art with the exception of the new use of the dispersants of the invention.

What is claimed is:

1. A process for reducing the dispersion time of inorganic and organic pigments in paint, varnish and organic base ink media, which process comprises adding about 0.1 percent to about 5 percent by weight of said media of at least one organo-zirconium derivative selected from the group consisting of the amino alcohol zirconates having the formula $$(RO)_xZr[OC_2H_4N(R')_2]_{4-x}(HO_2CR'')_y$$

wherein R and R' are radicals selected from the group consisting of aryl, alkaryl, aralkyl, alkyl and substituted alkyl groups having up to 18 carbon atoms; R" is a radical selected from the group consisting of alkyl and substituted alkyl groups having from 10 to 18 carbon atoms; x is a number between 0 and 3, and y is a number whose maximum value equals $(4-x)$, and the polyhydric alcohol zirconates having the formula

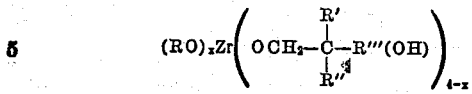

wherein R is a radical selected from the group consisting of aryl, aralkyl, alkaryl, alkyl and substituted alkyl radicals having up to 18 carbon atoms, R' R" are radicals selected from the group consisting of hydrogen alkyl and substituted alkyl groups, R''' is an organic member selected from the group consisting of the alkylene and substituted alkylene radicals and x is a number up to 3, and thoroughly dispersing said organo-zirconium derivative in said media.

2. Amino alcohol derivatives of zirconium suitable for use as dispersants and grinding aids, having the formula $$(RO)_xZr(OC_2H_4N(R')_2)_{4-x}(HO_2C-R'')_y$$

wherein R and R' are radicals selected from the group consisting of aryl, alkaryl, aralkyl, alkyl and substituted alkyl groups having up to 18 carbon atoms; R" is a radical selected from the group consisting of alkyl and substituted alkyl groups having from 10 to 18 carbon atoms; x is a number between 0 and 3, and y is a number whose maximum value equals $(4-x)$.

3. A polyhydric alcohol derivative of zirconium having the formula

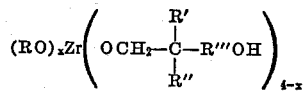

wherein R is a radical selected from the group consisting of aryl, aralkyl, alkaryl, alkyl and substituted alkyl radicals having up to 18 carbon atoms, R' and R" are radicals selected from the group consisting of hydrogen alkyl and substituted alkyl groups, R''' is an organic member selected from the group consisting of alkylene and substituted alkylene radicals and x is a number up to 3.

4. The process of claim 1 wherein said organo-zirconium derivative is diethyl - di - (triethanolamine)-zirconate.

5. The process of claim 1 wherein said organo-zirconium derivative is diethyl-di-(triethanolamine)-zirconate-N-oleate.

6. The process of claim 1 wherein said organo-zirconium derivative is diethyl-di-(triethanolamine)-zirconate-N, N-distearate.

7. The process of claim 1 wherein said organo-zirconium derivative is diisopropyl-di-(2-ethylhexandiol-1,3)-zirconate.

8. The process of claim 1 wherein said organo-zirconium derivative is diisopropyl-di-(triethanolamine)-zirconate.

9. The process of claim 1 wherein said organo-zirconium derivative is diisopropyl-di-(triethanolamine)-zirconate-N-oleate.

10. A pigment-containing composition consisting essentially of a pigment and a medium therefor, said medium containing from about 0.1% by weight thereof to about 5 percent of at least one organo-zirconium derivative selected from the group consisting of the amino alcohol zirconates defined by formula $$(RO)_xZr[OC_2H_4N(R')_2]_{4-x}(HO_2CR'')_y$$

wherein R and R' are radicals selected from the group consisting of aryl, alkaryl, aralkyl, alkyl and substituted alkyl groups having up to 18 carbon atoms; R" is a radical selected from the group consisting of alkyl and substituted alkyl groups having from 10 to 18 carbon atoms; x is a number between 0 and 3, y is a number whose maximum value equals (4−x), and the polyhydric alcohol zirconates having the formula

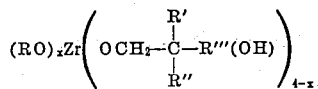

wherein R is a radical selected from the group consisting of aryl, aralkyl, alkaryl, alkyl and substituted alkyl radicals having up to 18 carbon atoms, R', and R'' are radicals selected from the group consisting of hydrogen, alkyl and substituted alkyl groups, R''' is an organic member selected from the group consisting of the alkylene and substituted alkylene radicals and x is a number up to 3.

References Cited in the file of this patent

UNITED STATES PATENTS

| | | |
|---|---|---|
| 2,233,358 | Nutting | Feb. 25, 1941 |
| 2,386,885 | Downs | Oct. 16, 1945 |
| 2,641,558 | Urban | June 9, 1953 |
| 2,681,922 | Balthus | June 22, 1954 |
| 2,774,689 | Orthmer | Dec. 18, 1956 |
| 2,824,114 | Bostwick | Feb. 18, 1958 |
| 2,845,445 | Russell | July 29, 1958 |
| 2,894,966 | Russell | July 14, 1959 |

FOREIGN PATENTS

| | | |
|---|---|---|
| 1,060,204 | France | Mar 31, 1954 |
| 272,585 | Great Britain | June 13, 1927 |
| 941,430 | Germany | Apr. 12, 1956 |

OTHER REFERENCES

Journal of Chemical Society (London), England, December 1952, pp. 4960–63. Article by Bradley, Halins, Mehrotor and Wardlan.